United States Patent

Crawford

[15] 3,676,505

[45] July 11, 1972

[54] 4-(4-METHYLCYCLOHEX-3-EN-1-YL)PENT-4-EN-1-OL AND A PROCESS FOR ITS SYNTHESIS

[72] Inventor: Robert J. Crawford, Wyoming, Ohio

[73] Assignee: The Procter & Gamble Company, Cincinnati, Ohio

[22] Filed: Dec. 29, 1969

[21] Appl. No.: 888,891

[52] U.S. Cl. .................. 260/631.5, 260/468 R, 260/598, 260/665 R
[51] Int. Cl. .................................................... C07c 35/00
[58] Field of Search .................................... 260/617 R, 631.5

[56] References Cited

OTHER PUBLICATIONS

Searles, J. Am. Chem. Soc., 73 124–125, 1951

*Primary Examiner*—Howard T. Mars
*Attorney*—Edmund J. Sease and Jack D. Schaeffer

[57] ABSTRACT

Disclosed herein is the synthesis of 4-(4-methylcyclohex-3-en-1-yl)pent-4-en-1-ol, a novel compound useful as a starting reagent for the production of lanceol and lanceal, known perfume materials. Limonene is first metalated and then reacted with ethylene oxide to give the novel compound. This compound can then be converted to a known aldehyde which can be used to produce lanceol and lanceal by known processes.

1 Claim, No Drawings

4-(4-METHYLCYCLOHEX-3-EN-1-YL)PENT-4-EN-1-OL AND A PROCESS FOR ITS SYNTHESIS

BACKGROUND OF THE INVENTION

This invention relates to the production of lanceol and lanceal by a novel process wherein limonene is used as the starting reactant.

Lanceol is a naturally occurring sesquiterpenic alcohol found in the essential oil from the wood of *Santalum lanceolatum* as well as being obtained from the oil of *Osyris teunofolia*. The essential oils themselves are an important class of perfume materials. These naturally occurring oils are extracts or distillates from the flowers, leaves, or roots of many different plants. Each essential oil, though, has an odor or flavor that is characteristic of the plant from which it is isolated. The oils usually contain a large number of individual components, the relative proportions and nature of which differ, of course, depending on the plant source. Rather exhaustive studies have been reported in connection with the determination of the individual essential oil constituents. Results of these studies have shown that, as expected, not all the individual constituents of a particular oil contribute to the organoleptic properties of that oil. Thus, any attempt to duplicate the aroma of a naturally occurring essential oil does not necessarily require the syntheses of all of the individual components.

In connection with the oil found in the wood of *Santalum lanceolatum* it was reported by Ruegg, Pfiffner, and Montavon in *Recherches* (Paris), No. 15, 3 (1966) that one of the constituents, lanceol, possesses a woody odor and is consequently suitable as a perfume material. It was additionally disclosed in the same article that lanceal, the oxidation product of lanceol, possesses an odor reminiscent of sandalwood.

While lanceol itself finds use as a perfume material, it can also be used in the reconstitution of the naturally occuring oil in which it is found. By reconstitution is meant the synthesis of each of the various components found in the oil and their mixing together in the same proportions as found in the natural state.

Processes for the synthesis of both lanceol and lanceal are known. However, these previous syntheses require many steps and are not commercially feasible. For instance, one synthesis of lanceol, as reported by Ruegg, et al., supra, requires eight steps. Another reported synthesis found in *Indian J. Chem.*, 5, 475, (1967) by O. P. Vig, Salota, B. Vig, and Ram requires even more steps. In contradistinction to the syntheses of lanceol and lanceal known heretofore, the processes disclosed herein offer unexpectedly simple and commercially feasible synthetic routes.

SUMMARY OF THE INVENTION

Briefly stated, this invention concerns the discovery that metalated limonene can be converted to a novel intermediate and the further discovery that the said novel intermediate is useful as a reactant in producing the known and useful lanceol or its oxidation product, lanceal.

Accordingly, one of the objects of the present invention is the synthesis of a novel compound useful as an intermediate for further syntheses.

More specifically an object of the invention is to synthesize 4-(4-methylcyclohex-3-en-1-yl)pent-4-en-1-ol.

Another object of the invention is a novel process for the synthesis of 4-(4-methylcyclohex-3-en-1-yl)pent-4-en-1-ol.

A further object of the invention is a novel process for the production of 4-(4-methylcyclohex-3-en-1-yl)pent-4-enal.

A still further object is a novel process for the production of lanceol.

Another object of the invention is a novel process for the synthesis of lanceal.

Other objects of the invention will become apparent from a reading of the following discussion and examples.

DISCUSSION AND PREFERRED EXAMPLES

According to the present invention 4-(4-methylcyclohex-3-en-1-yl)pent-4-en-1-ol is synthesized from a metalated limonene, 2-(4-methylcyclohex-3-en-1-yl)allyllithium. The synthesis of this metalated limonene is fully disclosed in copending application Ser. No. 888,893, filed Dec. 29, 1969. As used in the aforementioned application and the present application 2-(4-methylcyclohex-3-en-1-yl)allyllithium is referred to as metalated limonene.

As disclosed in the above said application, readily available limonene is metalated to form a stable compound useful for the synthesis of various known products. Additionally it has been discovered that metalated limonene can be used as the starting reactant for the production of a novel compound which itself finds utility in synthesizing known and useful materials.

The widely distributed terpene limonene is a naturally occurring substance found in several essential oils, in some as the main constituent, especially in the citrus oils. Limonene is found in the optically active forms in both the levo- and dextro-rotatory forms, as well as in the optically inactive or racemic form known as dipentene. The optically inactive limonene or dipentene occurs in various wood turpentines. d-Limonene has been identified in oil of orange, lemon, mandarin, lime, grapefruit, bergamot neroli, petitgrain, elemi, caraway, dill, fennel, celery, orthodon oils, etc. l-Limonene can be found in several pine needle oils, the cone oil of *Abies alba*, Russian turpentine oil, star anise, American wormseed, peppermint, spearmint, cajuput, Congo copal resin, etc. Separation of the limonene from the oils is well known and need not be set out in detail here. d-Limonene, l-limonene, and dl-limonene are all commercially available.

It should be recognized that both optically active forms of limonene (d- and l-limonene) and the optically inactive form (dl-limonene or dipentene) undergo the same chemical reactions. The products derived from each form differ only in optical activity. Thus, products obtained through this invention from the optically active forms are optically active while racemic limonene would lead to optically inactive products.

The optical configuration of the limonene used as the starting reactant is dictated only by the absolute stereochemistry desired for the final product. No loss of optical purity occurs during the conversion of either d- or l-limonene to the stable intermediate, metalated limonene, and subsequent conversions to the final products. Racemization during the reaction has not been detected. This factor is of importance in a strict synthesis of the naturally occurring lanceol, for this substance is known to exist in nature in only the levoform. Thus, in any strict reconstitution of an essential oil containing lanceol it is necessary to synthesize the levoform of the alcohol. However it should be recognized that the absolute configuration of the product is not always of importance and hence in such instances the optical form of the starting reactant limonene is of little concern for that particular process.

As disclosed in the aforementioned copending application Ser. No. 888,893, limonene can be metalated by use of a strong metalating agent to form metalated limonene. In the process of the present invention, metalated limonene is reacted with ethylene oxide to produce the alcohol 4-(4-methylcyclohex-3-en-1-yl)pent-4-en-1-ol. A schematic illustration of the reactions involved, including the production of the metalated limonene is represented by the following formulas:

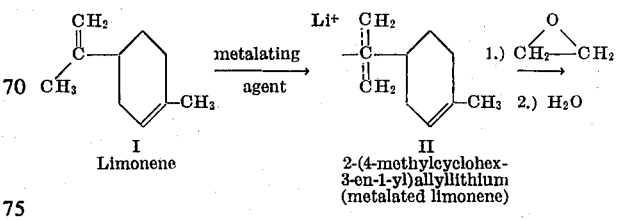

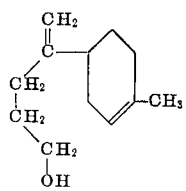

III
4-(4-methylcyclohex-3-en-
1-yl)pent-4-en-1-ol

The metalating agent used in the reaction with limonene comprises an organolithium-ditertiary amine complex. More specifically the organolithium is any primary alkyllithium having two to 10 carbon atoms. The ditertiary amine is selected from those diamines having four or less carbon atoms between the amino groups. The ratio ranges of organolithium to amine to limonene on a mole equivalent basis is 1:0.25–2:1–10. A temperature range of 25° to 70° C and reaction time of from 1 to 24 hours is suitable in the metalation reaction to produce metalated limonene of formula II.

The formula assigned metalated limonene as represented by II has not been determined with certainty but is rather theorized to be correct. Further conversions of the metalated limonene to known compounds indicate that metalation does occur at the side chain double bond and that formula II would be correct. Another possibility as to the correct representation of metalated limonene would be

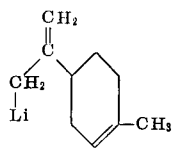

Regardless of the structure to be assigned to the product the 2-(4-methylcyclohex-3-en-1-yl)allyllithium that is formed is stable and can be stored indefinitely prior to further reaction with ethylene oxide. In going from the metalated limonene to 4-(4-methylcyclohex-3-en-1-yl)pent-4-en-1-ol no separation procedures are necessary prior to the addition of the oxide to the metalated limonene solution. That is, any unreacted limonene or solvents involved in the metalation reaction do not have to be removed prior to the ethylene oxide addition. Any limonene or solvent carried over can be separated at a later step in the process along with final purification of the product desired.

After the metalation process has been completed the reaction vessel is fitted with a low temperature thermometer and a gas inlet tube extending to the surface of the liquid. A blanket of inert gas is preferably maintained over the solution. The solution is cooled and stirred while ethylene oxide is added to the system. When the exothermic reaction has ceased the cooling means are removed and the solution is allowed to warm to room temperature (20° to 30° C). At this time water is added dropwise to hydrolyze the reaction product. The layers are then separated and the aqueous layer is extracted with ether. The combined organic solutions are washed successively with sodium chloride, e.g. 5 percent, hydrochloric acid, e.g. 3M, aqueous sodium chloride again, e.g., 5 percent, and then dried and evaporated. Fractional distillation yields the desired product of Formula III as a colorless oil.

As previously mentioned, metalated limonene does not have to be separated from its reaction mixture prior to any further reactions such as the addition of the reactant ethylene oxide in the present invention. The solvents or concentrations used in the metalation reaction do not have to be altered before the oxide addition. As disclosed in the aforementioned application covering metalated limonene the solvent used can vary from a 2 molar to a 0.1 molar solution based on the organolithium reagent prior to any amine or limonene additions. The solvent used can be the alkanes having five to 10 carbon atoms or the cycloalkanes having five to 10 carbon atoms.

The ethylene oxide reaction takes place instantaneously even at low temperatures. Temperatures as high as the boiling point of the solvent can be employed at atmospheric pressure. However, it is preferred that the temperature be maintained in the range of −70° to 25° C. The most preferred reaction temperature range is −70° to −40° C. Pressures lower than atmospheric pressure have no beneficial result in the reaction and preferably are avoided, but higher pressures can be used. Pressures ranging from atmospheric pressure to 10 atmospheres are preferred with atmospheric pressure being the most preferred.

The ethylene oxide can be added in either the gaseous form or in the liquid form if its temperature is maintained below its boiling point (13° C). Regardless of whether the oxide is added as a liquid or gas, however, at least 1 mole equivalent of the ethylene oxide is added per mole equivalent of metalated limonene. Preferably 1–6 mole equivalents of ethylene oxide per mole equivalent of metalated limonene are added. Greater amounts of gaseous oxide can be used, however, with any unreacted excess being recovered for further use.

The reaction with the metalated limonene is preferably maintained under a blanket of inert gas to prevent the formation of by-products resulting from reaction with oxygen or moisture in the atmosphere. Nitrogen and argon are two examples of gases that can be used, though certainly not exhaustive of the inert gases that are suitable. The main consideration is that the gas blanket be inert.

The addition of water to hydrolyze the reaction product to the 4-(4-methylcyclohex-3-en-1-yl)pent-4-en-1-ol is mildly exothermic so that external cooling may be necessary during this hydrolysis reaction. Temperatures higher than the boiling point of any solvent must preferably be avoided. The preferred temperature range for this addition is 0° to 70° C. At least one equivalent of water is needed for each equivalent of metalated limonene. A preferred range of mole equivalents of water to mole equivalents of metalated limonene is 1–80:1.

The compound III is isolated from the reaction mixture as a liquid by distillation.

Oxidation of the novel alcohol III yields the known aldehyde IV as represented by the following:

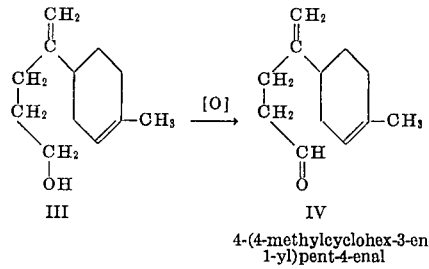

III                    IV
                4-(4-methylcyclohex-3-en-
                1-yl)pent-4-enal In the above process many different oxidation techniques can be used to form the aldehyde. Such a conversion of an alcohol to an aldehyde is a well-studied and reported conversion with many oxidation reagents possible. However, the conversion of the particular alcohol III to the aldehyde IV is sOmewhat difficult due to the presence of other reaction sites with resultant unwanted by-products being formed if the proper oxidation technique is not used. For the alcohol III a chromium oxide oxidation route has been found as one suitable method of forming the aldehyde without the formation of undesirable by-products. The most preferred conversion route is oxidation by the Collins reagent, i.e., a solution of dipyridine-chromium oxide in anhydrous dichloromethane. Such an oxidation technique was first disclosed by Collins, Hess, and Frank in *Tetrahedron Letters*, 3363 (1968). Based on a 2 to 1 mole ratio of pyridine to chromium oxide a total amount of dipyridine-chromium oxide complex to form a mole ratio of 3 to 10 for each mole of the alcohol III has been found to cause the oxidation of the alcohol to the aldehyde IV. A higher ratio of complex can be used but no advantage would arise from so doing. The preferred ratio of complex to alcohol is 6–6.5:1. A concentration of 1–10 percent complex in dichloromethane is suitable with a 5 percent concentration being the preferred concentration.

Using this oxidation technique the conversion is substantially completed in a time ranging from 5 to 60 minutes at room temperature (20° to 30° C). Higher temperatures should be avoided because of the possibility of forming undesirable by-products. Temperatures as low as 0° C can be employed but room temperature is preferred.

The conversion to IV is performed by the following procedure. To a solution of the 4-(4-methylcyclohex-3-en-1-yl)pent-4-en-1-ol prepared in the manner above discussed is added the oxidation reagent with stirring. After the reaction is completed the mixture is filtered and washed. The product formed is recovered as a liquid by distillation.

The 4-(4-methylcyclohex-3-en-1-yl)pent-4-enal is a known material and has been reported as the starting material for the syntheses of lanceol and lanceal by Ruegg et al., supra. These syntheses are represented by the following schematic formulas:

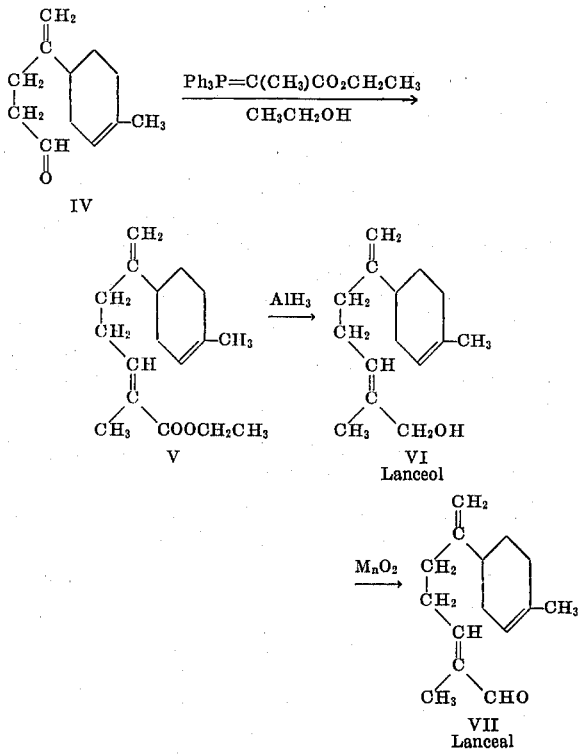

The synthesis of compound IV by the novel process disclosed herein provides a more feasible method of synthesizing lanceol than those methods known heretofore, That is, the known and useful lanceol and lanceal can now be synthesized by a more commercially feasible process because a known intermediate in the process (compound IV) is itself produced by a unique synthesis described herein, with such synthesis being more commercially attractive than prior syntheses of compound IV.

During the formation of compound V and subsequent reactions the cis-form of V is also formed in addition to the above representation showing only the trans-form. The cis-, trans- isomers of formulas V to VII can be isolated at any stage in the process by standard procedures if it is so desired.

The following examples are given to illustrate the invention.

EXAMPLE I

A solution of metalated limonene was prepared in the manner disclosed in the aforementioned Ser. No. 888,893 from 200 ml (0.29 mole) of 1.45 M n-butyllithium in n-hexane, 45 ml (35 g, 0.30 mole) N,N,N', N'-tetramethylethylenediamine (TMEDA) and 100 ml (84 g, 0.62 mole) l-limonene. That is, a flask fitted with a magnetic stirring bar and gas inlet tube was charged with the n-butyllithium solution. The contents of the flask were maintained under a blanket of nitrogen at all times. TMEDA was added dropwise to the stirred solution. To the resulting mixture was added the limonene dropwise. Stirring was continued for 1 hour and the mixture then allowed to stand overnight at room temperatures. The reaction flask was fitted with a low temperature thermometer and an adjustable gas inlet tube extending to the surface of the liquid. The solution was stirred and cooled to −60° C while static nitrogen pressure in the system was maintained. Ethylene oxide gas, which was first passed through a column of Drierite, was introduced through the gas inlet tube at a point just above the surface of the liquid. The rate of addition of ethylene oxide was made in intervals with the additions being regulated so that the solution temperature did not exceed −40° C. When the exothermic reaction had ceased, the cooling bath was removed, and the gas inlet tube was extended below the surface of the liquid. The ethylene oxide flow was continued while the solution was allowed to warm to room temperature. The gas flow was stopped, and 100 ml of water was added dropwise (mildly exothermic) to hydrolyze the reactant product to the alcohol. The mixture was diluted further with water, the layers were separated, and the aqueous solution was extracted with three 125-ml portions of ether. The combined organic solutions were washed successively with 100 ml of 5 percent aqueous sodium chloride, 100 ml of 3 M hydrochloric acid, 150 ml of 5 percent aqueous sodium chloride, and were dried and evaporated. Recovered limonene (33 g) was separated from the resulting liquid by distillation. Fractional distillation of the residue yielded 28.8 g (55 percent, based on n-butyllithium) of 4-(4-methyl-cyclohex-3-en-1-yl)pent-4-en-1-ol as a colorless oil, bp 92°–97 ° C (0.20 mm), glpc purity 94 percent. The analytical sample was purified by preparative glpc followed by molecular distillation.

EXAMPLE II

A solution of 2.00 g (0.011 mole) of alcohol III (purity 94 percent) in 22 ml of anhydrous dichloromethane (freshly distilled from phosphorous pentoxide) was placed under an argon atmosphere in a 500-ml round-bottom flask containing a magnetic stirring bar. To this stirred solution was added rapidly a solution of 18.6 g (0.072 mole) dipyridine-chromium oxide in 350 ml of anhydrous dichloromethane (Collins reagent). The resulting mixture was allowed to stir for 15 min. and was filtered under suction through a cake of Celite. The insoluble residue and filter cake were washed with several portions of ether, and the combined filtrate and washings were transferred to a separatory funnel. The organic solution was washed successively with 200 ml of 10 percent aqueous sodium chloride, 150 ml of 2 M hydrochloric acid, 150 ml of 2 percent aqueous sodium bicarbonate, 150 ml of 5 percent aqueous sodium chloride, and was dried and evaporated. Distillation of the residue (1.88 g) through a short-path apparatus yielded 1.08 g (55 percent) of 4-(4-methylcyclohex-3-en-1-yl)pent-4-enal as a pale yellow liquid, bp 70°–76° C (0.2 mm), glpc purity 89 percent. The analytical sample was obtained as a colorless oil after purification by preparative glpc followed by molecular distillation.

In the above oxidation reaction other oxidation techniques can be used such as a chromic acid oxidation.

What is claimed is:

1. 4-(4-Methylcyclohex-3-en-1-yl)pent-4-en-1-ol.

* * * * *